United States Patent [19]

Fontaine

[11] 3,844,584
[45] Oct. 29, 1974

[54] JAW AND WEDGE FOR FIFTH WHEELS

[76] Inventor: John P. K. Fontaine, P.O. Drawer 10887, Birmingham, Ala. 35202

[22] Filed: Nov. 15, 1973

[21] Appl. No.: 416,047

[52] U.S. Cl. ............................... 280/434, 252/343
[51] Int. Cl. .......................................... B62d 53/10
[58] Field of Search ........... 280/434, 432; 292/343; 339/273 R

[56] References Cited
UNITED STATES PATENTS

| | | | |
|---|---|---|---|
| 1,939,402 | 12/1933 | Moser | 292/343 |
| 2,106,724 | 2/1938 | Cope | 339/273 R X |
| 2,371,750 | 3/1945 | Fontaine | 280/434 |
| 3,630,545 | 12/1971 | Fontaine | 280/434 |

Primary Examiner—Leo Friaglia
Attorney, Agent, or Firm—Jennings, Carter & Thompson

[57] ABSTRACT

An improved jaw and wedge for fifth wheels in which the cooperating surfaces thereof are provided with means substantially to eliminate any tendency of the wedge to "squirt," that is, to move or shift relative to the jaw, when load is applied on the jaw by the king pin on the towed vehicle. The generally tapered cooperating surfaces of the jaw and wedge are provided with a plurality of coacting surfaces which are substantially normal to the line of thrust imposed upon the jaw by the king pin, thereby eliminating any component of force tending to cause the wedge to shift toward uncoupling position.

6 Claims, 7 Drawing Figures

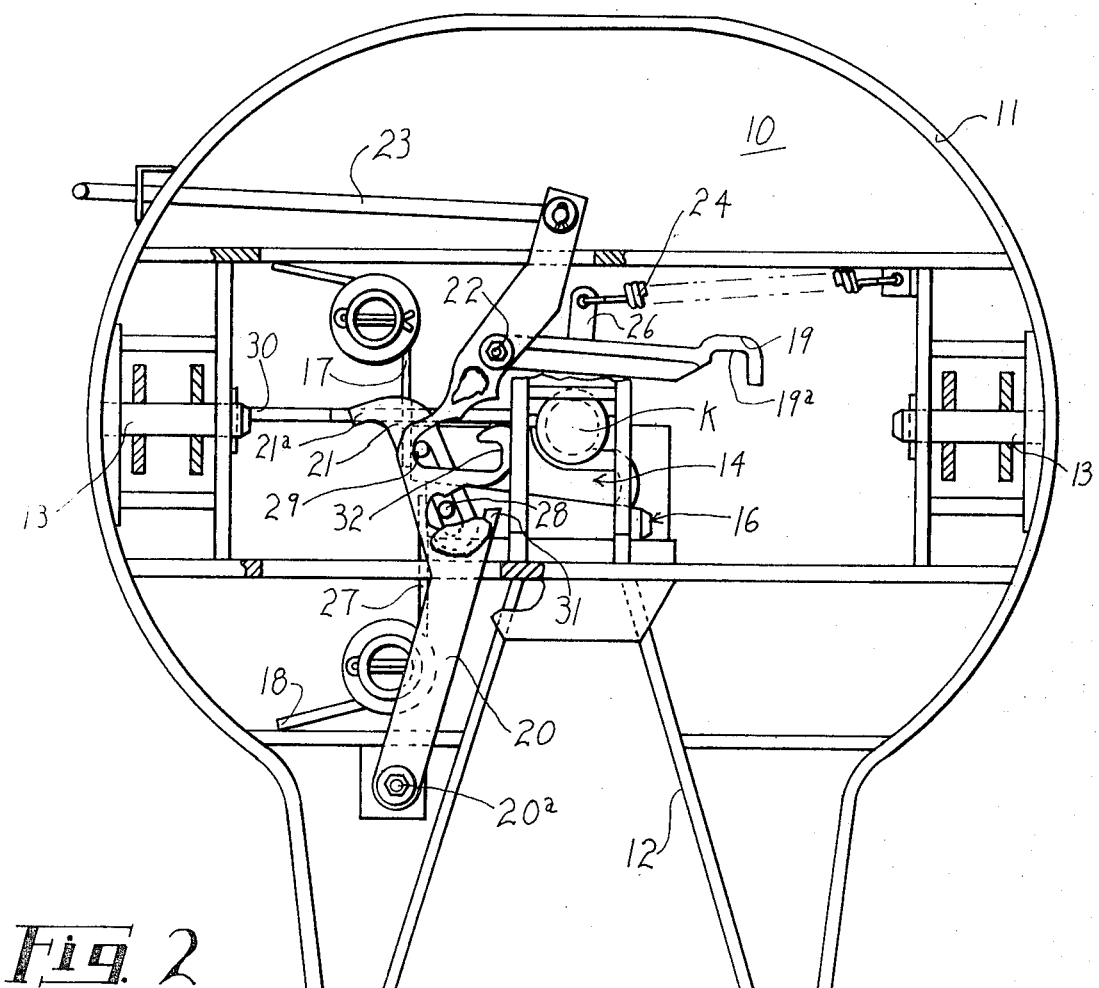
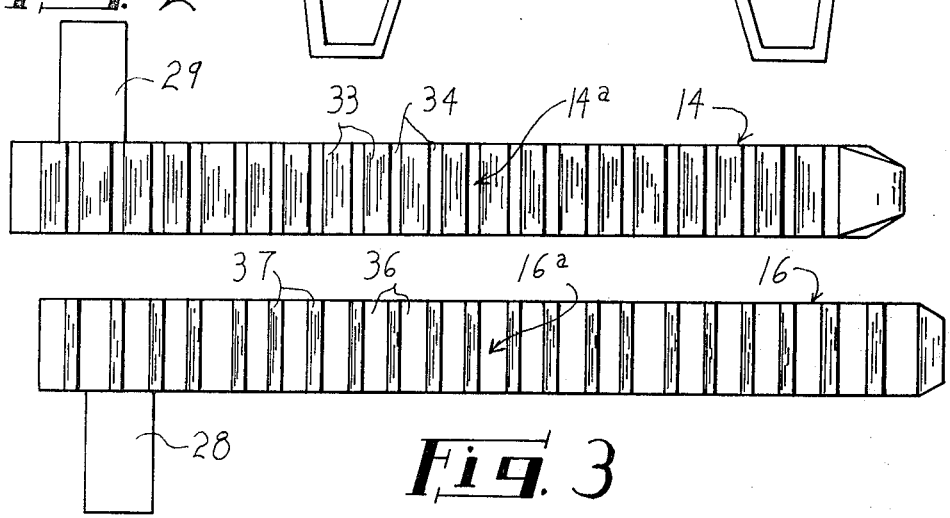

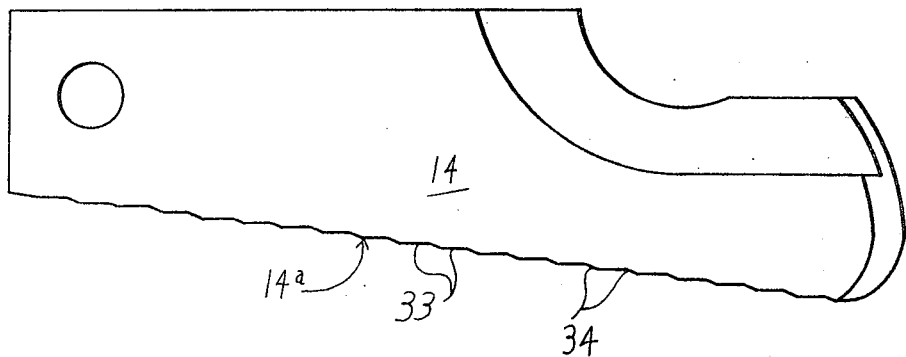
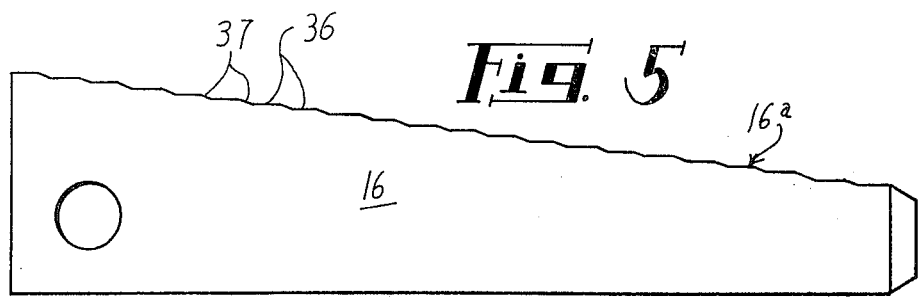
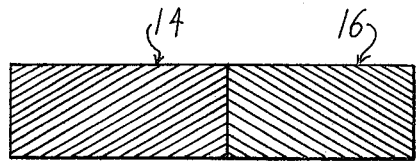
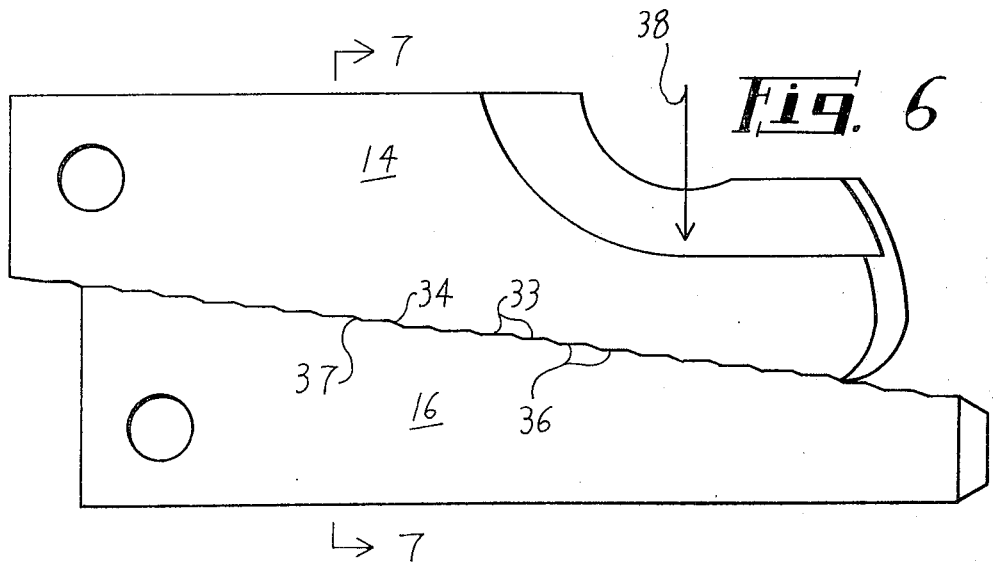

3,844,584

JAW AND WEDGE FOR FIFTH WHEELS

My invention relates to an improved jaw and wedge for fifth wheels and generally stated has for an object the provision of means on the cooperating surfaces of said jaw and wedge to prevent the wedge from "squirting" when the load is applied, as when towing a vehicle.

In the art to which my invention relates it is customary in fifth wheels to secure the jaw in locked position by means of a wedge. The edge of the wedge slides against an edge of the jaw, along one side, and the other side of the wedge is backed up by heavy, load transmitting frame members of the fifth wheel. Heretofore, a problem has existed in that when under load a component of the force developed by the load on the jaw tends to cause the wedge to shift or "squirt" toward uncoupling position. Under certain load conditions and under certain wear conditions of the parts the wedge has been known to be forced out of proper engagement with the jaw, developing abnormal slack in the coupling. Sometimes such component of force causes relatively minor shifting of the wedge, but this results in looseness of the king pin relative to the jaw, causing undue wear and possibly resulting in breakage of the parts due to impact forces as the load surges behind a towing tractor.

My invention contemplates machining on the cooperating, generally tapered surfaces of the wedge and jaw a plurality of surfaces which, when the two are engaged, eliminate all of the component of force tending to move the wedge toward uncoupling position, namely, to eliminate "squirting" of the wedge.

More particularly, my invention contemplates a wedge and jaw of the character designated in which there is a multiplicity of plane surfaces machined onto the cooperating sides of the jaw and wedge, each of which surfaces lies normal to the direction of force applied by the load on the jaw, thereby eliminating any component of force tending to move the wedge relative to the jaw.

Apparatus illustrating features of my invention is shown in the accompanying drawings forming a part of this application in which:

FIG. 1 is a bottom view of a fifth wheel, certain parts being broken away and in section, which fifth wheel is illustrative of one with which my invention may be employed;

FIG. 2 is a side elevational view of the wedge engaging surface of my improved jaw member;

FIG. 3 is a side elevational view of the jaw engaging surface of my improved wedge, the wedge being inverted relative to the position that it occupies in FIG. 1;

FIG. 4 is a plan view of my improved jaw removed from the remaining portions of the apparatus;

FIG. 5 is a plan view of my improved wedge, removed from the remaining portions of the apparatus;

FIG. 6 is a plan view of my improved wedge and jaw in the relative positions which they occupy when the king pin is coupled; and, FIG. 7 is a detail sectional view taken generally along line 7—7 of FIG. 6.

Referring now to the drawings for a better understanding of my invention I illustrate the same in association with a type of fifth wheel which is shown, described and claimed in U.S. Pat. No. 3,630,545 dated Dec. 28, 1971. While I have elected to show my invention in association with the fifth wheel of said patent, as the description proceeds it will be apparent that the same is useful in practically any fifth wheel of the wedge and jaw type.

As shown in FIG. 1 the fifth wheel embodies an upper plate 10, a reinforcing skirt portion 11, the converging entering slot or opening 12 for the king pin to be connected, and mounting means 13 on which the fifth wheel is pivotally mounted to the tractor, all as is understood. Also as is understood the fifth wheel comprises a jaw 14 and a locking wedge 16 associated therewith. In coupled position as shown in FIG. 1 the king pin K has entered the slot and has moved into the proper connecting position relative to the fifth wheel, the jaw 14 has moved in to engage about and lock the king pin in place, and the wedge 16 has moved into place to lock the jaw. Springs indicated at 17 and 18 urge the jaw and wedge, respectively, toward locking position. Also at 19 I illustrate what is commonly called in the art a "bumper" and at 21 what is commonly called a "timer." It will be understood that the bumper is pivotally connected at 22 to an arm 20, pivoted at 20a, to which is connected an operating handle 23. A tension spring 24 connected to a lug 26 on the bumper 19 urges the bumper and handle toward locking position.

The timer is provided with a slot 27 in one end of which slidably fits a pin 28 depending from the underside of the wedge 16. The timer is also mounted about a pin 29 which depends from the jaw 14. When the handle 23 is moved to the left as shown in FIG. 1, pin 28 is first engaged by a portion 31 of the arm 20 thus to withdraw the wedge to some extent and subsequent to this the pin 29 is engaged by another portion 32 of the arm 20, thus to withdraw the jaw. The timer has an extension 21a which engages behind a wall 30 of the framework of the fifth wheel. When the handle is moved all the way to the left as viewed in FIG. 1 a notch 19a in the bumper 19 engages a part of the framework to hold the parts in uncoupled position, permitting the king pin to be moved into and out of the fifth wheel. With the parts in the uncoupled position automatic coupling is effected simply by backing the tractor carrying the fifth wheel onto the king pin K, whereupon the bumper is released, permitting the parts automatically to move to coupled position, under the influence of the various springs involved.

For a more detailed explanation of the specific fifth wheel under discussion attention is directed to said U.S. Pat. No. 3,603,545. Suffice it here to say that in the art, heretofore, as for instance in said U.S. Pat. No. 3,630,545, when force is applied by the king pin on the jaw 14, such force is transmitted to the sloping sides of the jaw and wedge, thus developing a component of force tending to move the wedge 16 toward uncoupling position, that is, to the left as viewed in FIG. 1. In the art this is called "squirting."

My invention, as stated, contemplates so forming the engaging or working surfaces of the jaw and wedge as to eliminate any tendency of the wedge to squirt, when the load of the tow is applied to the jaw through the king pin.

As shown in the remaining figures of the drawings, the working surface 14a of the jaw is provided with a multiplicity of plane surfaces 33. These surfaces are joined in step-like fashion by sloping surfaces 34.

In similar manner the working surface 16a of the wedge 16, that is, the surface which lies alongside the surface 14a of the jaw, is provided with a multiplicity of plane surfaces 36. These are joined by a multiplicity of sloping surfaces 37.

As best shown in FIG. 6 when the wedge and jaw are in king pin locking position the surfaces 33–36 are in engagement with each other. Therefore, since these surfaces are normal to the direction of force imposed by the king pin on the jaw as indicated by the arrow 38, there is no tendency for the wedge 16 to squirt, or move to the left, as viewed in FIGS. 1 and 6.

The surfaces 33–34 and 36–37 formed on the working edges or surfaces of the jaw and wedge respectively are numerous enough and the rise or difference in elevation between them small enough to permit the wedge to be moved to jaw locking position by arm 20 and lever 23 or springs in normal fashion. That is, during final movement of the wedge to the right as shown in FIGS. 1 and 6 in response to right movement of the handle 23, it is obvious that the wedge and jaw must separate very slightly inasmuch as the apexes of the surfaces 34 and 37 must ride over each other. However, during movement from full locked position toward uncoupled position, the surfaces 36 simply slide relative to the surfaces 33 on the jaw.

While there may be other suitable shapes and configurations of surfaces on the working edges 14a and 16a other than the specific ones shown, the essential features of such coacting surfaces is that they be so configured relative to each other that the forces imparted on the jaw by the king pin, when towing a load, embodies no component tending to move the wedge toward unlocking position. Thus, with my improved wedge and jaw I have completely eliminated the likelihood that the wedge will move to unlocking position, due to the load on the parts. At the same time, the wedge may be moved both to coupling and uncoupling positions in the normal manner.

While I have shown my invention in but one form, it will be obvious to those skilled in the art that it is not so limited, but is susceptible of various other changes and modifications without departing from the spirit thereof.

What I claim is:

1. An improved wedge and jaw for a fifth wheel adapted to couple a tractor to a towed vehicle through a king pin,
   a. complementarily tapered surfaces on the cooperating sides of the jaw and wedge, and
   b. said surfaces being provided with a plurality of mutually engageable, generally plane surfaces lying generally at right angles to the direction of force applied to the jaw by the king pin, whereby tendency of the wedge to squirt is substantially eliminated.

2. As an article of manufacture, a wedge for a fifth wheel having a working surface adapted to engage a surface of a king pin locking jaw of a fifth wheel, there being a plurality of generally plane surfaces on said working surface lying generally at right angles to the forces imposed on the wedge by the jaw and disposed to be engaged by like surfaces on the jaw.

3. As an article of manufacture, a jaw member for a fifth wheel having a working surface adapted to engage a surface of a wedge member of a fifth wheel, there being a plurality of generally plane surfaces on said working surface lying generally at right angles to the forces imposed on the jaw by the wedge and disposed to be engaged by like surfaces on the wedge.

4. The combination with a fifth wheel of the kind having a jaw member adapted to engage a king pin of a towed vehicle, and a wedge member disposed to hold the jaw in engagement with the king pin, the improvement comprising,
   a. complementarily tapered surfaces on the cooperating sides of the jaw and wedge, and,
   b. the said surfaces of said jaw and wedge having coacting surfaces thereon which lie generally at right angles to the direction of force applied to the jaw by the king pin whereby the forces imposed by the jaw on the wedge are devoid of components tending to cause the wedge to slide relative to the jaw.

5. In a fifth wheel for tractors of the kind having a jaw member adapted to engage a king pin carried by a towed vehicle and a wedge member having a tapered surface engageable with a tapered surface carried by the jaw member and adapted, upon uncoupling movement, to slide relative to the jaw member, the improvement comprising means on the engaging, generally tapered surfaces of said jaw and wedge member disposed, when the fifth wheel is coupled about a king pin, to transmit to the wedge forces imposed by the king pin on the jaw in a direction substantially parallel to the line of thrust of the king pin, said means comprising a plurality of mutually engaging surfaces on the tapered surfaces of the jaw and wedge which are generally normal to the line of thrust of the force imposed by the king pin, thereby substantially to eliminate components of force tending to cause the wedge to move toward uncoupling position relative to the jaw.

6. Apparatus as defined in claim 5 in which said plurality of mutually engaging surfaces on the tapered surfaces of the jaw and wedge are connected in step-like fashion by sloping sections on both the wedge and jaw and so configured and relatively dimensioned to permit the wedge to slide into and out of locking position relative to the jaw.

* * * * *